United States Patent
Matsuda

(10) Patent No.: US 7,290,727 B1
(45) Date of Patent: Nov. 6, 2007

(54) CLOSED FACE REEL

(75) Inventor: Kazuyuki Matsuda, Higashikurume (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 11/723,273

(22) Filed: Mar. 19, 2007

(30) Foreign Application Priority Data

Jul. 31, 2006   (JP) .............................. 2006-209075

(51) Int. Cl.
*A01K 89/01* (2006.01)

(52) U.S. Cl. ....................................... 242/238; 242/256

(58) Field of Classification Search ................ 242/234, 242/235, 236, 238, 239, 256, 257, 263
See application file for complete search history.

(56) References Cited

U.S. PATENT DOCUMENTS

| | | | | |
|---|---|---|---|---|
| 873,784 A * | 12/1907 | Reichardt | .................... | 242/256 |
| 2,428,908 A * | 10/1947 | Cooper et al. | ............... | 242/256 |
| 2,591,338 A * | 4/1952 | Cooper | ........................ | 242/256 |
| 3,446,453 A * | 5/1969 | Pachner | ....................... | 242/256 |
| 4,640,470 A * | 2/1987 | Ohler | ........................... | 242/238 |
| 4,850,548 A * | 7/1989 | Faulkner | ..................... | 242/256 |
| 5,443,218 A * | 8/1995 | Ciocca | ......................... | 242/256 |
| 7,216,825 B2 * | 5/2007 | Oishi et al. | ................. | 242/247 |

FOREIGN PATENT DOCUMENTS

| JP | 53-36952 A | 4/1978 |
|---|---|---|
| JP | 2005-102524 A | 4/2005 |

* cited by examiner

*Primary Examiner*—Emmanuel M Marcelo
(74) *Attorney, Agent, or Firm*—Sughrue Mion Pllc.

(57) ABSTRACT

In a first embodiment of the present invention, a fishing line latching member can be returned from the fishing line releasable state (clutch OFF) to the fishing line windable state (clutch ON) simply by operating a return operation member, without rotatably operating the handle as in a conventional manner. This enables the user to respond promptly even when he/she gets a bite immediately after casting the fishing line. Furthermore, it also allows the user to use a finger of his/her hand holding the fishing rod to perform an operation for removing slack of the fishing line by using the return operation member.

3 Claims, 11 Drawing Sheets

CLOSED FACE REEL

BACKGROUND OF THE INVENTION

The present invention relates to a closed face reel, which includes: a fishing line guiding portion (pick-up pin), provided on a circumference of a rotor rotating in accordance with rotation of a handle and allowed to have protruding and downgoing movement, for guiding a fishing line to a spool; and a cover for covering the spool and the rotor.

As disclosed in Patent Documents 1 and 2, for example, a closed face reel is commonly configured such that a rotational axis or cam member having a rotor fixed on its end is moved forward by pushing or pulling a push button or control lever provided on a reel main body. This movement releases a protruding restricted state of a pick-up pin provided on the outer circumference of the rotor, thrusting the pick-up pin into the rotor by a spring force. In this manner, the closed face reel is shifted to a fishing line releasable state (clutch OFF state).

Furthermore, in the closed face reel, the rotor is rotated in accordance with rotational operation of a handle. This brings the closed face reel in a clutch ON state in which the pick-up pin protrudes from the outer circumference of the rotor outwardly in its radial direction. In this manner, the closed face reel is returned to a fishing line windable state.

Patent Document 1: Japanese Published Examined Utility Model Application No. S53-36952

Patent Document 2: Japanese Published Unexamined Patent Application No. 2005-102524

The closed face reel having the above structure, however, requires rotational handle operation in order to return from the fishing line releasable state (clutch OFF state) to the fishing line windable state (clutch ON state). When the user gets a bite immediately after casting the fishing line with his/her dominant arm, he/she needs to change the arm once to grip the fishing rod with another arm in order to rotatably operate the handle with his/her dominant arm, and thus cannot respond promptly.

Furthermore, the closed face reel is configured such that the fishing line is guided to the spool via the pick-up pin protruding from the outer circumference of the rotor. In this structure, the fishing line may move away from the pick-up pin unless the user controls the handle by applying a strong tension to the fishing line (i.e., unless slack of the fishing line is removed). As such, the closed face reel suffers from a great inconvenience, restricted flexibility, and poor operability especially during winding operation of the fishing line, since the user cannot use his/her both hands.

SUMMARY OF THE INVENTION

The present invention is made in view of the foregoing circumstances, and an object of the invention is to provide a closed face reel with good operability which is capable of returning from the fishing line releasable state to the fishing line windable state easily and immediately, without requiring handle control operation.

In order to solve the foregoing problems, the present invention provides a closed face reel comprising:

a reel main body;

a spool provided on the reel main body;

a rotor rotatably attached to the reel main body;

a handle provided on the reel main body for rotating the rotor;

a fishing line guiding portion for guiding a fishing line to be wound on the spool, the fishing line guiding portion being selectively positioned in a fishing line windable state in which the fishing line guiding portion protrudes from an outer circumference of the rotor and a fishing line releasable state in which the fishing line guiding portion does not protrude from the outer circumference of the rotor;

a releasing member provided on the reel main body, which moves the fishing line guiding portion from the fishing line windable state to the fishing line releasable state by repressing the releasing member;

a returning member provided on the reel main body, which moves the fishing line guiding portion from the fishing line releasable state to the fishing line windable state by depressing the returning member; and a cover covering the spool and the rotor.

According to the present invention, the closed face reel is capable of returning from the fishing line releasable state to the fishing line windable state easily and immediately, without requiring the handle operation. That is, the closed face reel according to the present invention is capable of returning from the fishing line releasable state (clutch OFF state) to the fishing line windable state (clutch ON state) simply by operating a returning member, without rotatably operating the handle as in a conventional manner. Thus, even when the user gets a bite immediately after casting the fishing line, he/she can respond promptly. Furthermore, slack of the fishing line can be removed by a simple operation using the finger(s) of his/her hand holding the fishing rod.

BRIEF DESCRIPTION OF DRAWINGS

FIG. 7 is a cross sectional side view illustrating the state in which the return operation member, shown in FIG. 5, is pushed in;

DETAILED DESCRIPTION OF PREFERRED EMBODIMENTS

Referring to drawings, the following will describe embodiments of the present invention.

Figure 1:
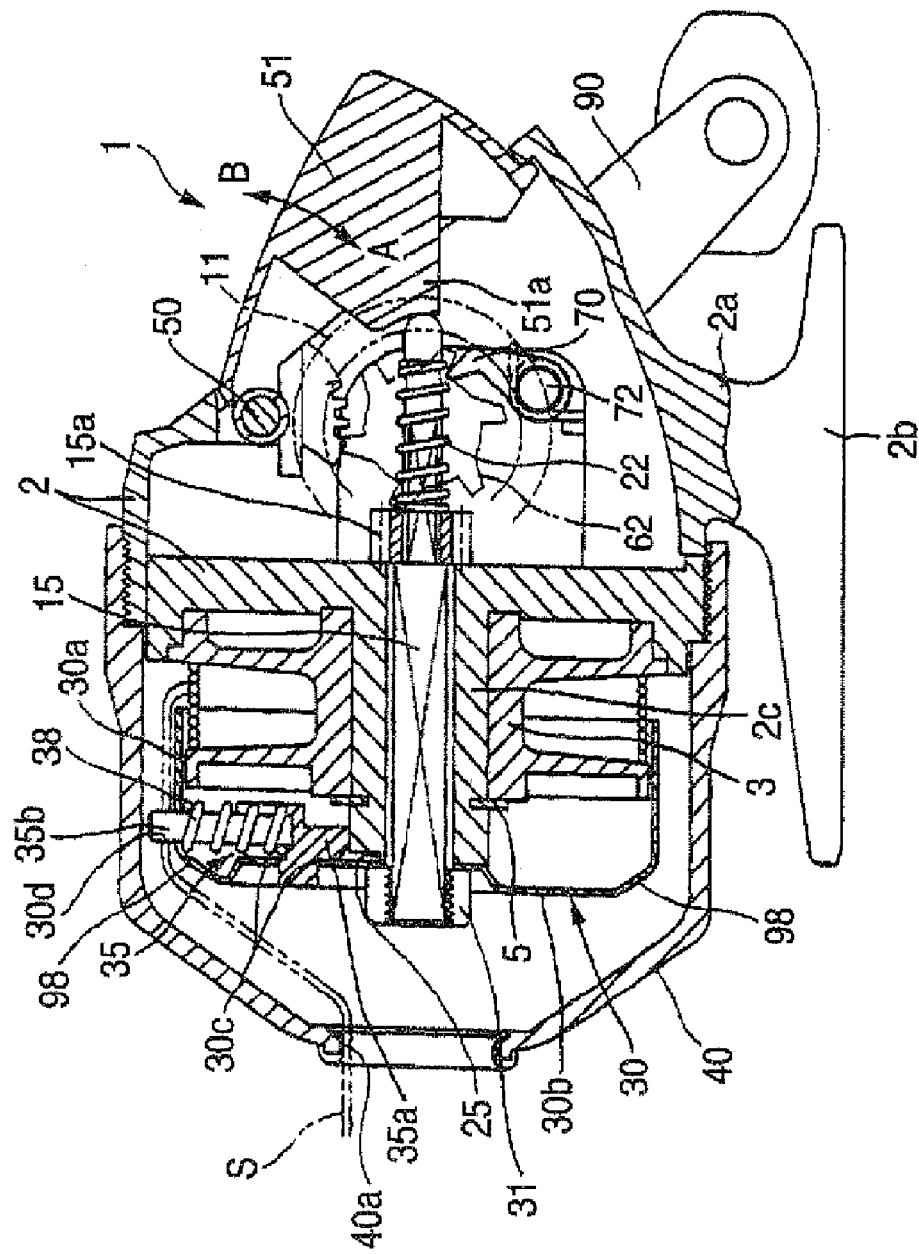
FIG. 1 is a cross sectional side view of a closed face reel in a fishing line windable state according to a first embodiment of the present invention.

FIG. 1 through FIG. 9 show a first embodiment of the present invention. Referring to FIG. 1 specifically, in a reel main body 2 of a closed face reel 1 according to the present embodiment, a leg portion 2a provided with a fishing rod mount portion 2b extending in front and back directions on its end is formed in an integrated manner. Furthermore, in the reel main body 2, a spool supporting cylinder 2c which protrudes forward is formed. On an outer circumference of the spool supporting cylinder 2c, supported is a spool 3 on which a fishing line is wound (the spool 3 is unrotatable, or is rotatably and frictionally connected by a drag mechanism). On the end side of the outer circumference of the spool supporting cylinder 2c, a retaining member (retaining ring) 5 by which the spool 3 is retained so as not to come off is attached. Furthermore, on a front end of the spool supporting cylinder 2c, formed is a cam portion 25 for moving and guiding a fishing line latching member described later, outwardly in the radial direction.

Figure 2:
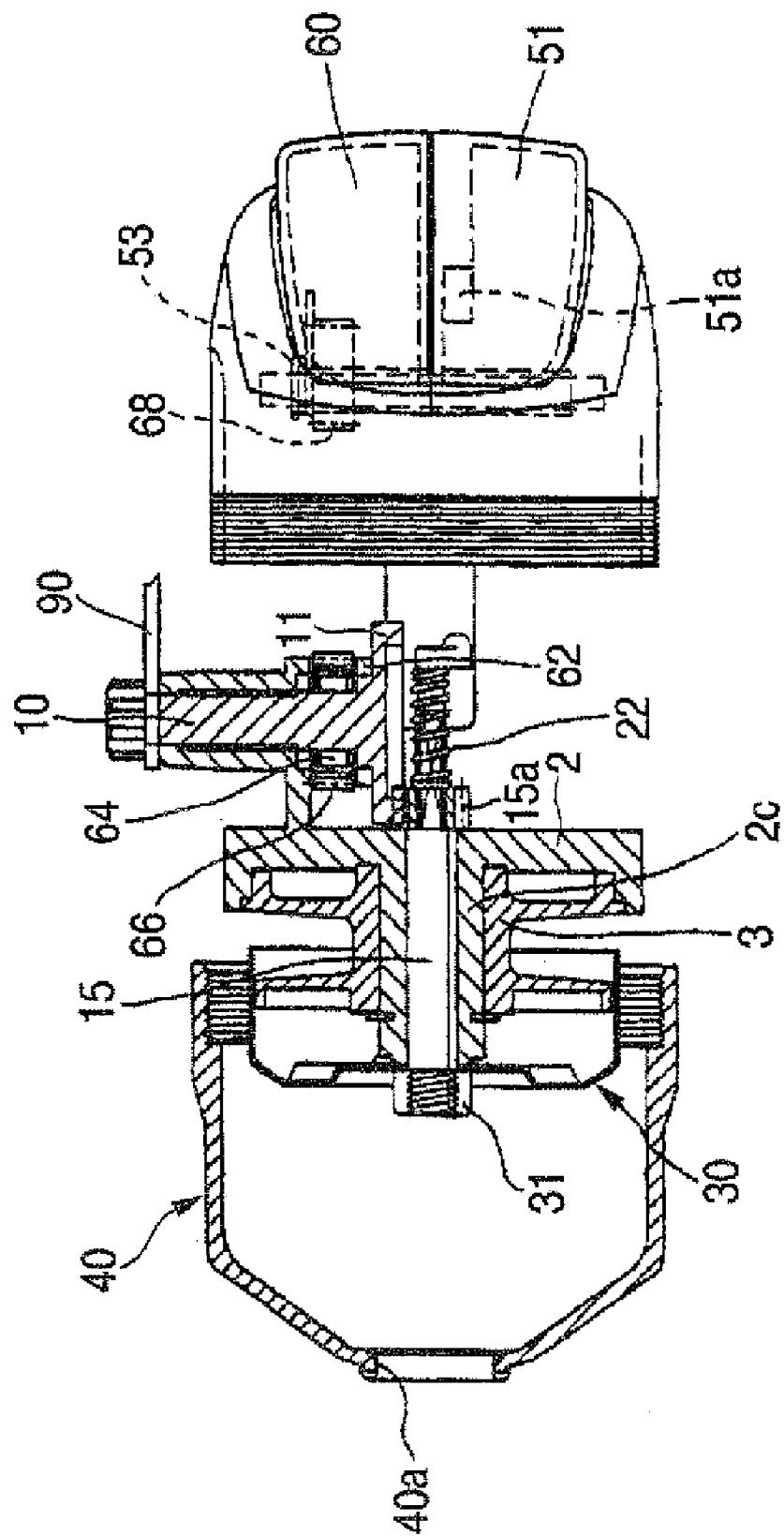
FIG. 2 is a plan exploded cross sectional view illustrating a substantial part of the closed face reel of FIG. 1.

As specifically shown in FIG. 2, the reel main body 2 incorporates a handle shaft (drive shaft) 10 which is rotatably supported and which has: a handle 90 attached thereto and rotatably operated; and a face gear 11 attached to the handle shaft 10. Furthermore, the reel main body 2 incorporates a main shaft 15 extending in a direction orthogonal to the handle shaft 10. The main shaft 15 is rotatably supported through the spool supporting cylinder 2c. On a base end side of the main shaft 15, a pinion 15a so as to engage with the face gear 11 is formed. Furthermore, on a rear end of the main shaft 15, a clutch urging spring 22 which constantly urges the main shaft 15 backwardly is provided.

On a front end side of the main shaft 15 a roof-shaped rotor 30 having an opening toward the spool 3 is attached. The rotor 30 is attached using a nut 31 so as to rotate integrally with the main shaft 15 and be unmovable in the shaft direction. Furthermore, as the handle 90 is rotatably operated, a circumference wall 30a of the rotor 30 is rotated around the spool 3 via the face gear 11 and the pinion 15a. On both sides of a front wall 30b of the rotor 30, catching portions 98 having a taper shape are formed. Each of the catching portions 98 catches a fishing line S between the catching portion 98 and inner surface of a covering member described later, during discharging of the fishing line.

Furthermore, in the present embodiment, a reversed rotation prevention mechanism is provided to allow the rotor 30 to rotate together with the main shaft 15, exclusively in a fishing line winding direction. Specifically, the reversed rotation prevention mechanism includes: a ratchet 62 formed (or attached) on the handle shaft 10 to be adjacent to the face gear 11 and having reversed rotation preventing nails; and a spring-urged reversed rotation preventing claw 70, pivotally provided in the reel main body 2 about a spindle 72 and engaging the nails of the ratchet 62.

On the circumference wall 30a of the rotor 30 is provided a fishing line latching member 35 as a fishing line guiding portion so as to freely move protrudingly and downgoingly. The fishing line latching member 35 includes: a main body portion 35a, located in the rotor 30, for engaging the cam portion 25 of the main shaft 15; and a pin 35b, located in a hole 30d formed on the circumference wall 30a, for picking up the fishing line S. Furthermore, on the front wall 30b of the rotor 30, a long hole 30c extending in the radial direction is formed. The long hole 30c is movably engaged with the main body portion 35a of the fishing line latching member 35. As such, the fishing line latching member 35 is supported by the rotor 30 so as to be movable in the radial direction.

Furthermore, between the main body portion 35a of the fishing line latching member 35 and an inner surface of the circumference wall 30a, an urging spring 38 is provided which constantly urges the fishing line latching member 35 inwardly in the radial direction (direction in which the pin 35b is thrust into the rotor 30).

On the front side of the reel main body 2 is detachably provided a covering member 40 which covers the spool 3 and the rotor 30, and which has a fishing line inserting hole 40a, formed on its front side, for leading out the fishing line. In this case, the fishing line S wound on the spool 3 is passed through the space between the circumference wall 30a of the rotor 30 and an inner wall of the covering member 40, so as to be led out from the fishing line inserting hole 40a.

Figure 3:
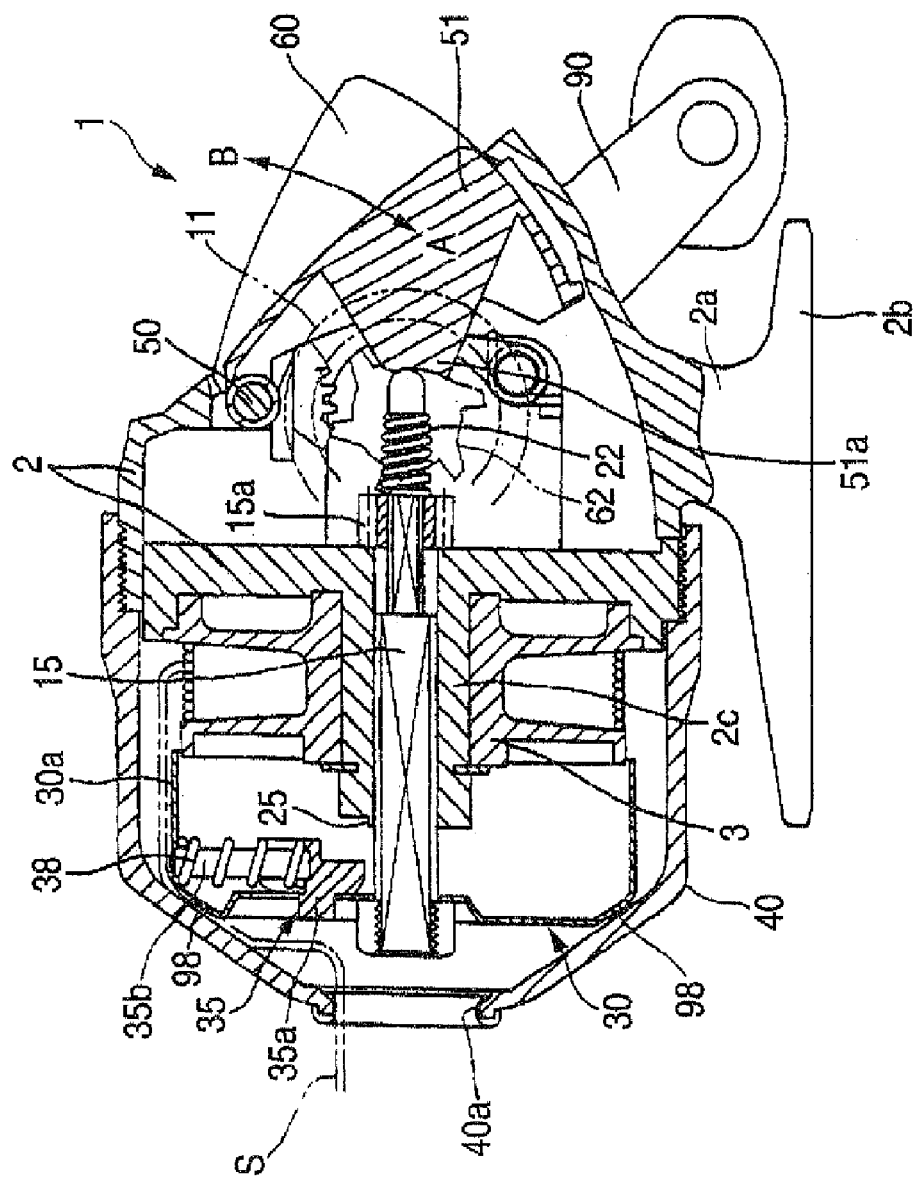
FIG. 3 is a cross sectional side view of the closed face reel of FIG. 1, in a state in which the fishing line windable state is released.

On the rear end of the reel main body 2 is supported a fishing line release operation member (releasing member) 51 so as to be movable about a spindle 50 (in a direction indicated by an arrow AB of FIG. 1 and FIG. 3). The fishing line release operation member 51 is provided and allowed to have push operation movement at a position allowing the user to simply operate it with a finger (particularly, a thumb) of his/her hand holding the fishing rod. Specifically, the fishing line release operation member 51 is constituted as a push operation button. Furthermore, the fishing line release operation member 51 has a portion protruding into the reel main body 2. This portion, formed as a compression acting portion 51a, comes in contact with the rear end of the main shaft 15.

Furthermore, on the rear end of the reel main body 2 is provided a return operation member (returning member) 60 for causing the pin 35b of the fishing line latching member 35, sunk into the rotor 30 as will be described later, to protrude from the circumference wall 30a of the rotor 30 outwardly in the radial direction (i.e., for causing the fishing line latching member 35 in the fishing line releasable state to return to the fishing line windable state). The return operation member 60 is provided to be adjacent to the fishing line release operation member 51, specifically to locate beside the fishing line release operation member 51, and allowed to have displacement movement. The return operation member 60 is supported so as to be movable about the spindle 50 relative to the reel main body 2 (in a direction indicated by the arrow AB of FIG. 3), while being provided and allowed to have push operation movement at a position allowing the user to simply operate it with a finger (particularly, a thumb) of his/her hand holding the fishing rod (i.e., a position allowing the user to laterally slide his/her finger with which the fishing line releasing operation portion 51 is operated). Specifically, the return operation member 60 is constituted as a push operation button.

Furthermore, as clearly shown in FIG. 5 through FIG. 8, a substantially fan-shaped first toothed wheel 68 is formed integrally on the inner surface of the return operation member 60 which faces inside of the reel main body 2. As shown in FIG. 2, the first toothed wheel 68 engages a second toothed wheel 66 which is provided oh the handle shaft 10 to be adjacent to the ratchet 62. Furthermore, the second toothed wheel 66 is attached to the handle shaft 10 via the one way clutch 64. This allows a force exerted exclusively in the direction in which the return operation member 60 is pushed (operation direction indicated by the arrow A of FIG. 3) to be transmitted to the handle shaft 10, while preventing a rotary motion force exerted in a direction in which the return operation member 60 returns (i.e., direction indicated by an arrow B of FIG. 3) from being transmitted to the handle shaft 10. Note that, as clearly shown in FIG. 6 and FIG. 8, between the reel main body 2 and the return operation member 60 is inserted an urging spring 53 which is held and wound on the spindle 50. The urging spring 53 constantly urges the return operation member 60 in the counterclockwise direction shown in FIG. 3 (direction indicated by the arrow B), i.e., in an opposite direction of the push operation direction.

Referring to FIG. 1 through FIG. 8, description is made as to actions of the closed face reel having the above structure.

FIG. 1 shows the fishing line windable state, in which the fishing line S is latched by the pin 35b of the fishing line latching member 35, and wound on the spool 3 as the rotor 30 is driven and rotated. At this time, the fishing line latching member 35, at the main body portion 35a, comes in contact with the outermost circumference of the cam portion 25 of the main shaft 15. Furthermore, the pin 35b protrudes from the circumference wall 30a of the rotor 30, resisting the biasing force of the urging spring 38.

In this state, when the fishing line release operation member 51 is pushed in, as shown in FIG. 3, the compression acting portion 51a rotationally moves in the clockwise direction (direction indicated by the arrow A of FIG. 1), resisting the biasing force of the urging spring 53. Furthermore, the main shaft 15 is moved toward the spool 3, resisting the biasing force of the urging spring 22. Accordingly, the rotor 3 is also moved integrally. This causes the bottom end of the main body portion 35a of the fishing line latching member 35 to be disengaged from the cam portion 25 of the main shaft 15. Furthermore, the pin 35b protruding from the circumference wall 30a of the rotor 30 sinks in the rotor 30 due to the biasing force of the urging spring 38, so that the fishing line releasable state is realized. At this time, since the rotor 30 has the fishing line catching function as described above, the fishing line S is led out from the fishing line inserting hole 40a while being caught between the catching portion 98 of the rotor 30 and an inner surface of the covering member 40.

Figure 4:
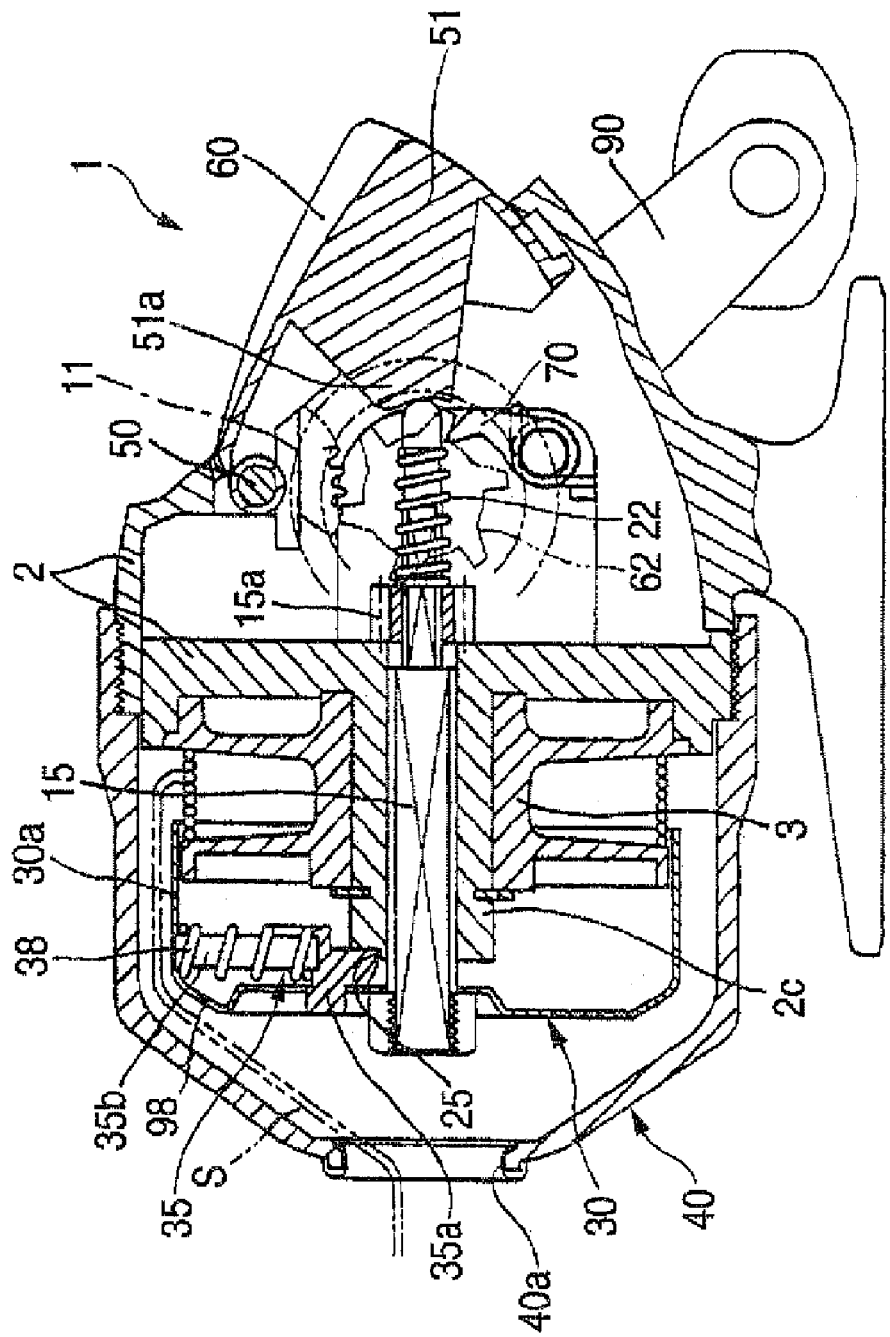
FIG. 4 is a cross sectional side view of the closed face reel of FIG. 1 in a fishing line releasable state.

In this state, when the user detaches his/her finger from the fishing line release operation member 51 while casting the fishing line, the state in which the fishing line is caught is released and the device is discharged. This state is illustrated in FIG. 4. At this time, the main shaft 15 and the fishing line release operation member 51 are returned to the state shown in FIG. 4 by the biasing forces of the urging springs 22 and 53, respectively. This allows the fishing line latching member 35 to reengage the cam portion 25 of the main shaft 15, enabling to realize a state where the cam portion 25 provides a cam action to the main body portion 35a of the fishing line latching member 35.

Figure 7:
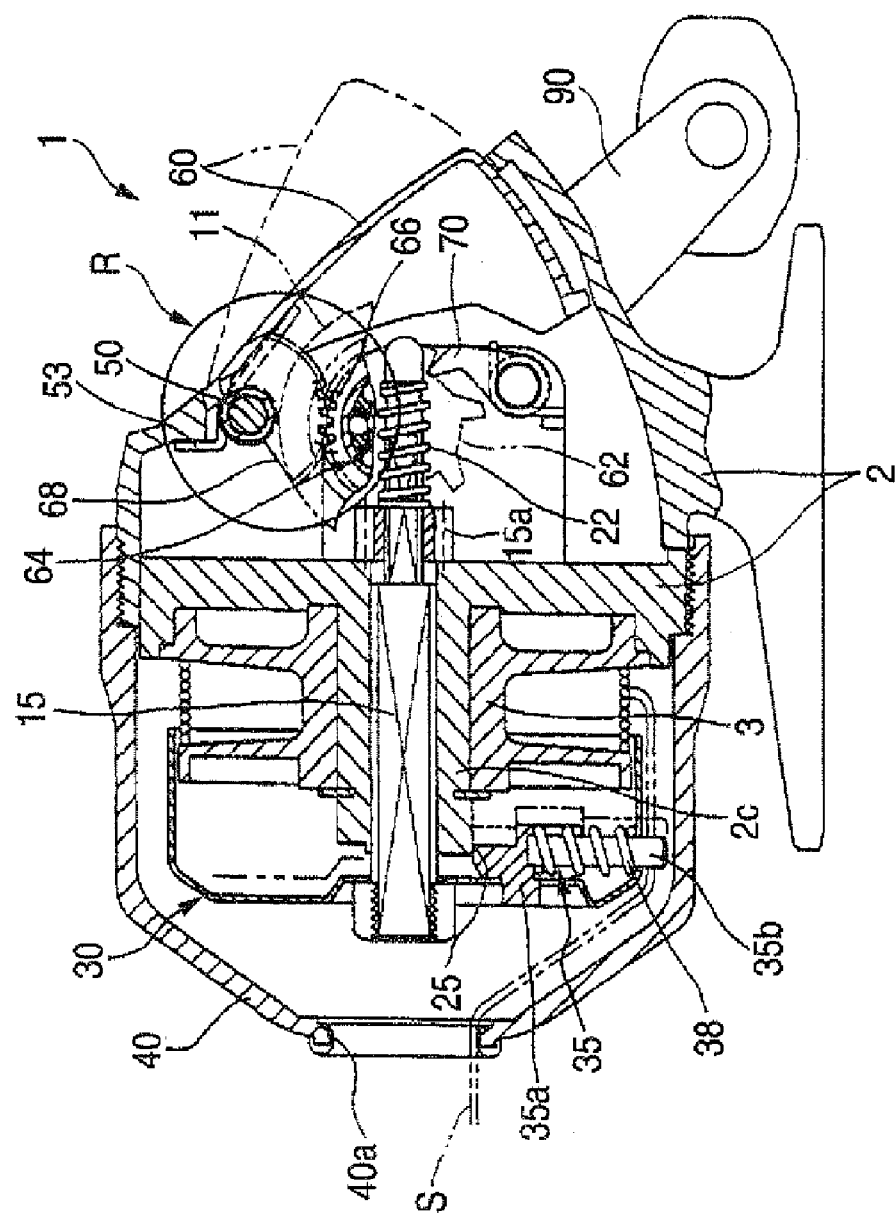
Figure 8:
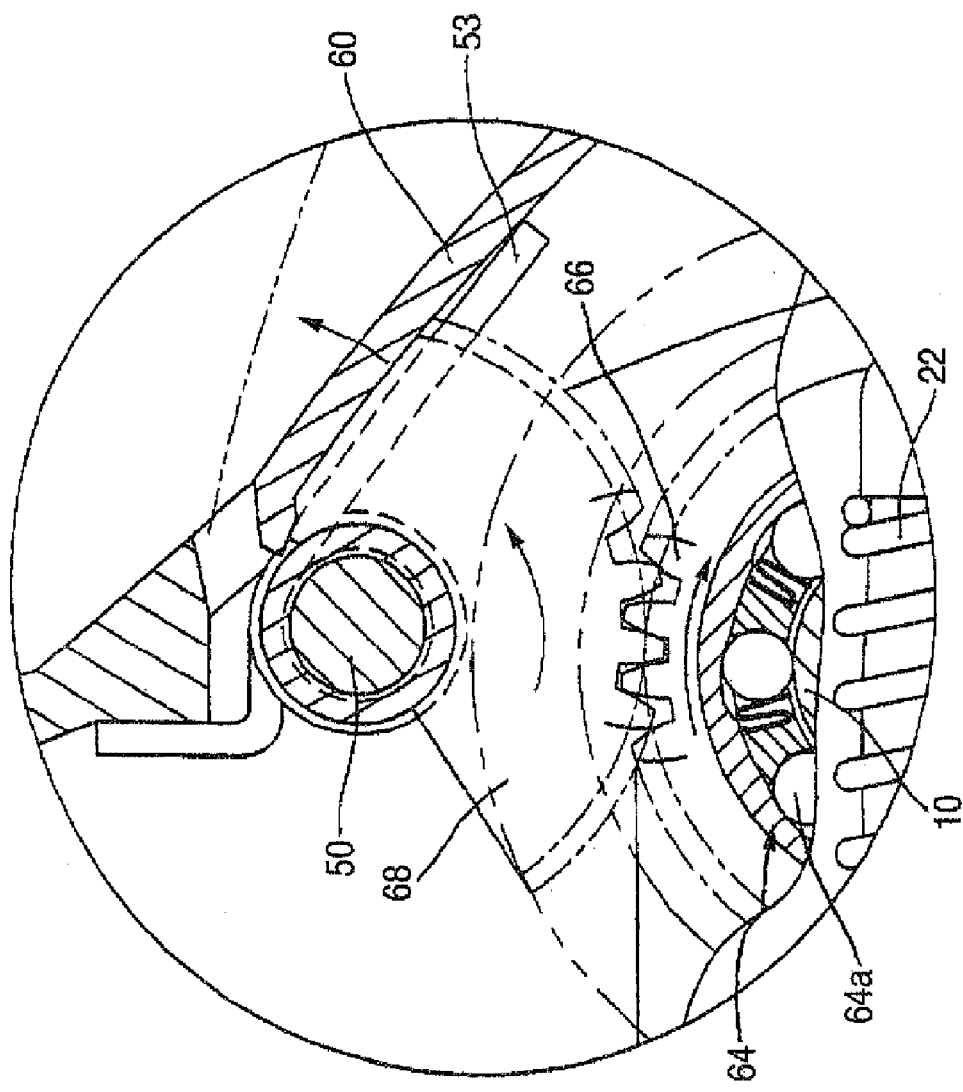
FIG. 8 is an enlarged cross sectional view illustrating an R part of FIG. 7.

Furthermore, when the return operation member 60 is pushed (rotationally moved in a direction indicated by the arrow A of FIG. 3), the first toothed wheel 68 rotationally moves in the clockwise direction (direction indicated by an arrow C of FIG. 6), and the handle shaft 10 rotates in the fishing line winding direction (direction indicated by an arrow D of FIG. 6) due to the engagement of the toothed wheels 66 and 68 and wedge action of the one way clutch 64 (wedge action is applied to rollers 64a of the one-way-clutch 64). This causes the main shaft 15, engaged with the handle shaft 10 via the face gear 11 and the pinion 15a, to rotate together with the rotor 30 in the fishing line winding direction, as shown in FIG. 7. Furthermore, with the cam action of the cam portion 25 of the main shaft 15 engaged with the bottom end of the main body portion 35a, the pin 35b of the fishing line latching member 35 protrudes from the circumference wall 30a of the rotor 30, resisting the biasing force of the urging spring 38, so that the fishing line S is picked up. In this state, when the finger is detached from the return operation member 60, the return operation member 60 automatically makes rotary motion and returns to the initial position by the biasing force of the urging spring 53, as shown in FIG. 8. The force exerted by the rotary motion, however, is not transmitted to the handle shaft 10 due to the action of the one way clutch 64 (the wedge action is not applied). Thereafter, the fishing line S can be wound around the spool 3 as guided by the pin 35b by winding operation using the handle.

Figure 5:
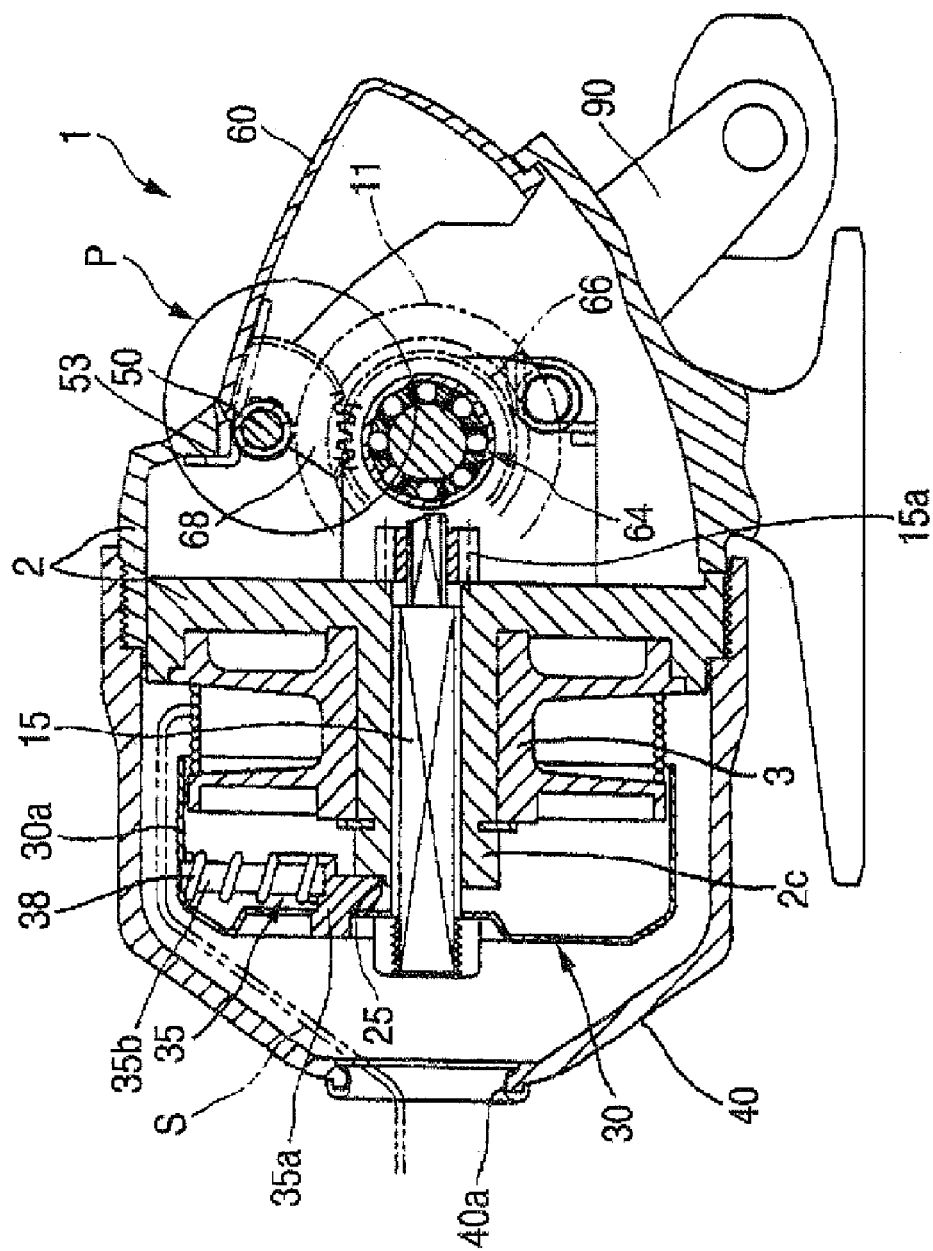
FIG. 5 is across sectional side view illustrating details of a mechanism of a return operation member of the closed face reel of FIG. 1 in the fishing line releasable state.
Figure 6:
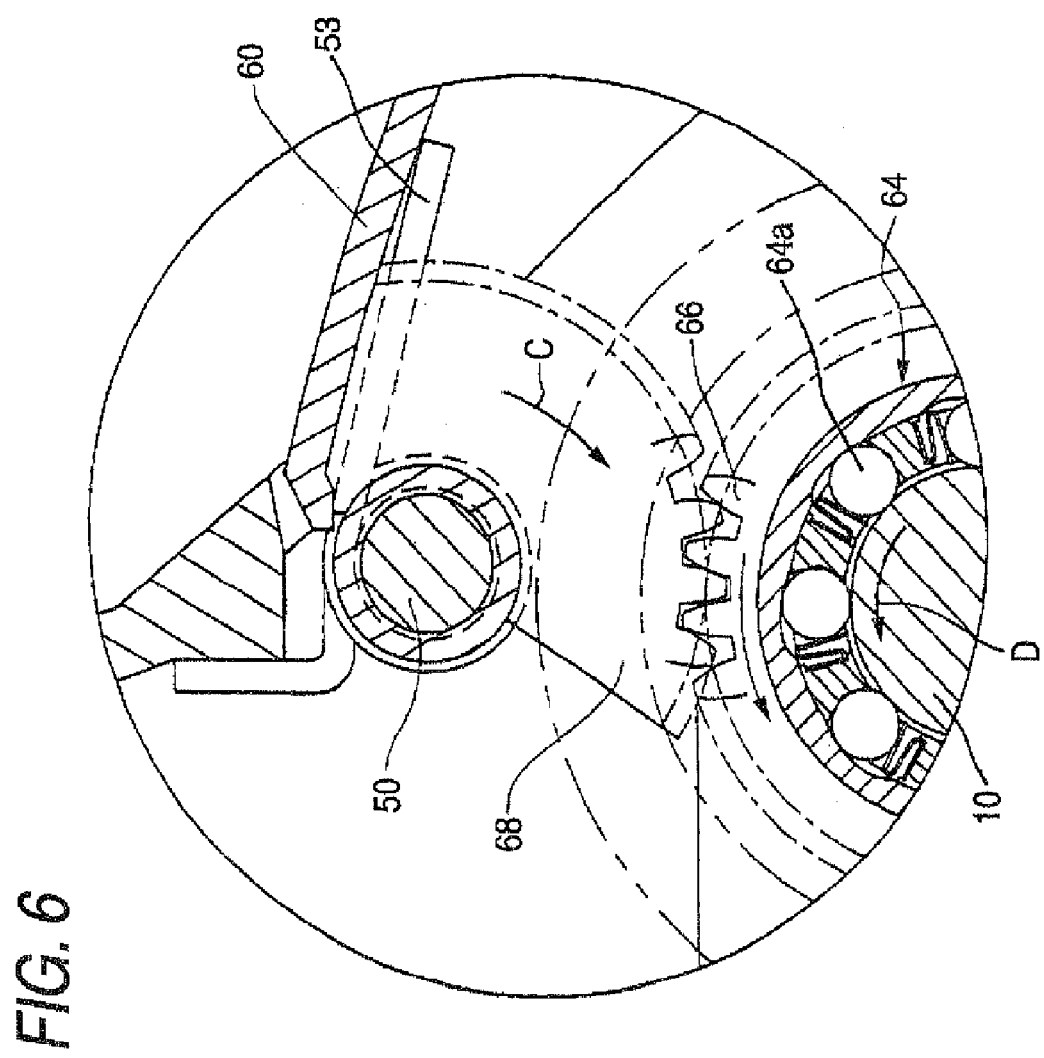
FIG. 6 is an enlarged cross sectional view illustrating a P part of FIG. 5.

As a matter of course, without using the return operation member 60, it is also possible to rotate the rotor 30 in the fishing line winding direction, by winding operation using the handle 90 in the state of FIG. 5. Thus, the fishing latching member 35 in the fishing line releasable state can be returned to be in the fishing line windable state.

As described above, in the present embodiment, the fishing line latching member 35 can be returned from the fishing releasable state (clutch OFF) to the fishing line windable state (clutch ON) simply by operating the return operation member 60, without rotatably operating the handle as in a conventional manner. This enables the user to respond promptly even when he/she gets a bite immediately after casting the fishing line. Furthermore, it also allows the user to use a finger of his/her hand holding the fishing rod to perform an operation for removing slack of the fishing line using the return operation member 60.

Furthermore, the present embodiment is configured such that with an operation of the return operation member 60 provided in the reel main body 2, the fishing line latching member 35 is returned to the fishing line windable state by power transmitted via the one way clutch 64. With this configuration, the user can easily perform the return operation without having any trouble, while holding the fishing rod.

Furthermore, in the present embodiment, the return operation member 60 is provided in the reel main body 2 so as to be adjacent to the fishing line release operation member 51. This enables the user to switch between the fishing line windable state and the fishing line releasable state by simply using a finger(s) of his/her handholding the fishing rod. Thus, the efficiency of fishing is remarkably improved.

Figure 9:
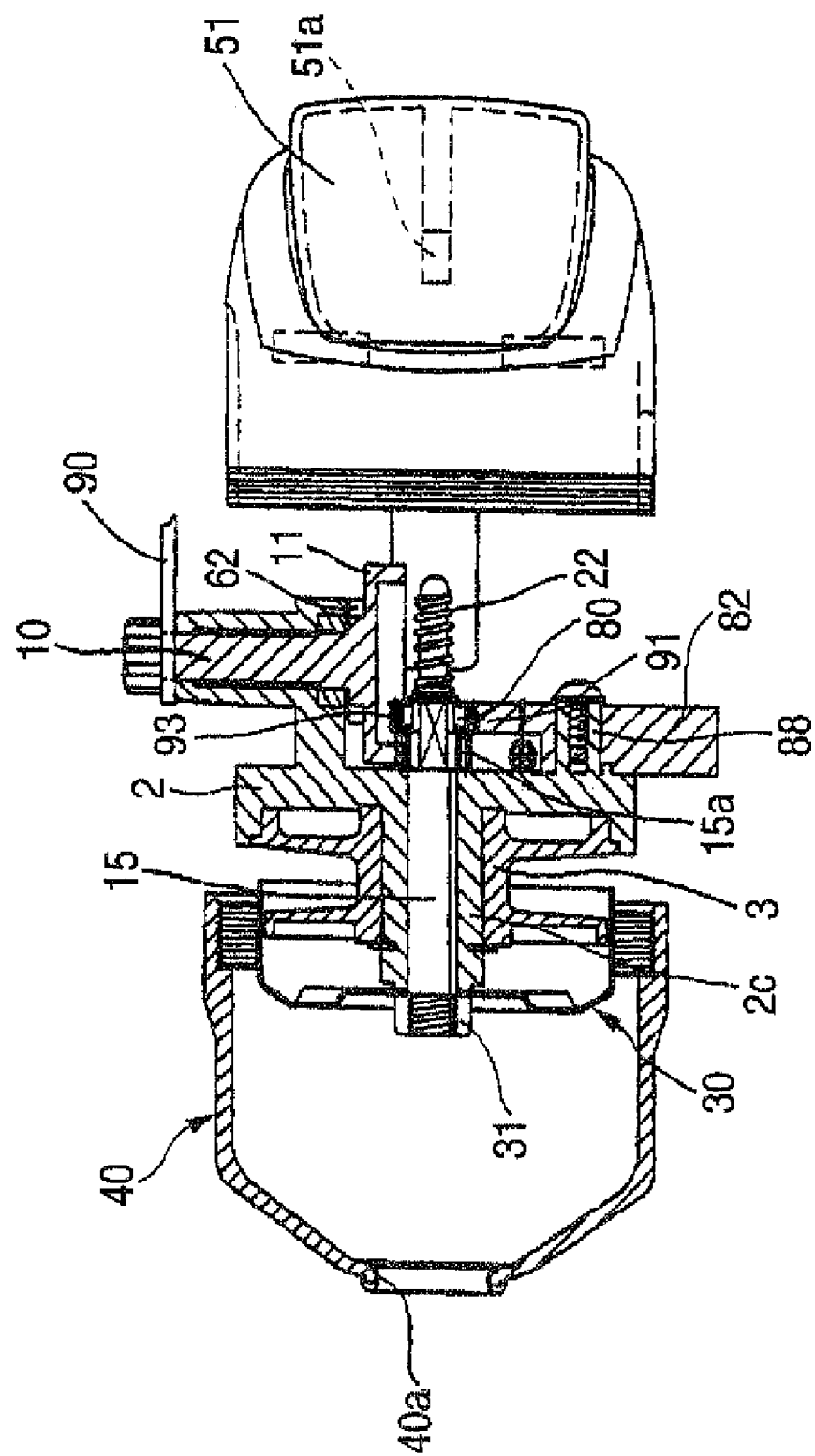
FIG. 9 is a plan exploded cross sectional view illustrating substantial part of a closed face reel according to the first embodiment of the present invention.
Figure 10:
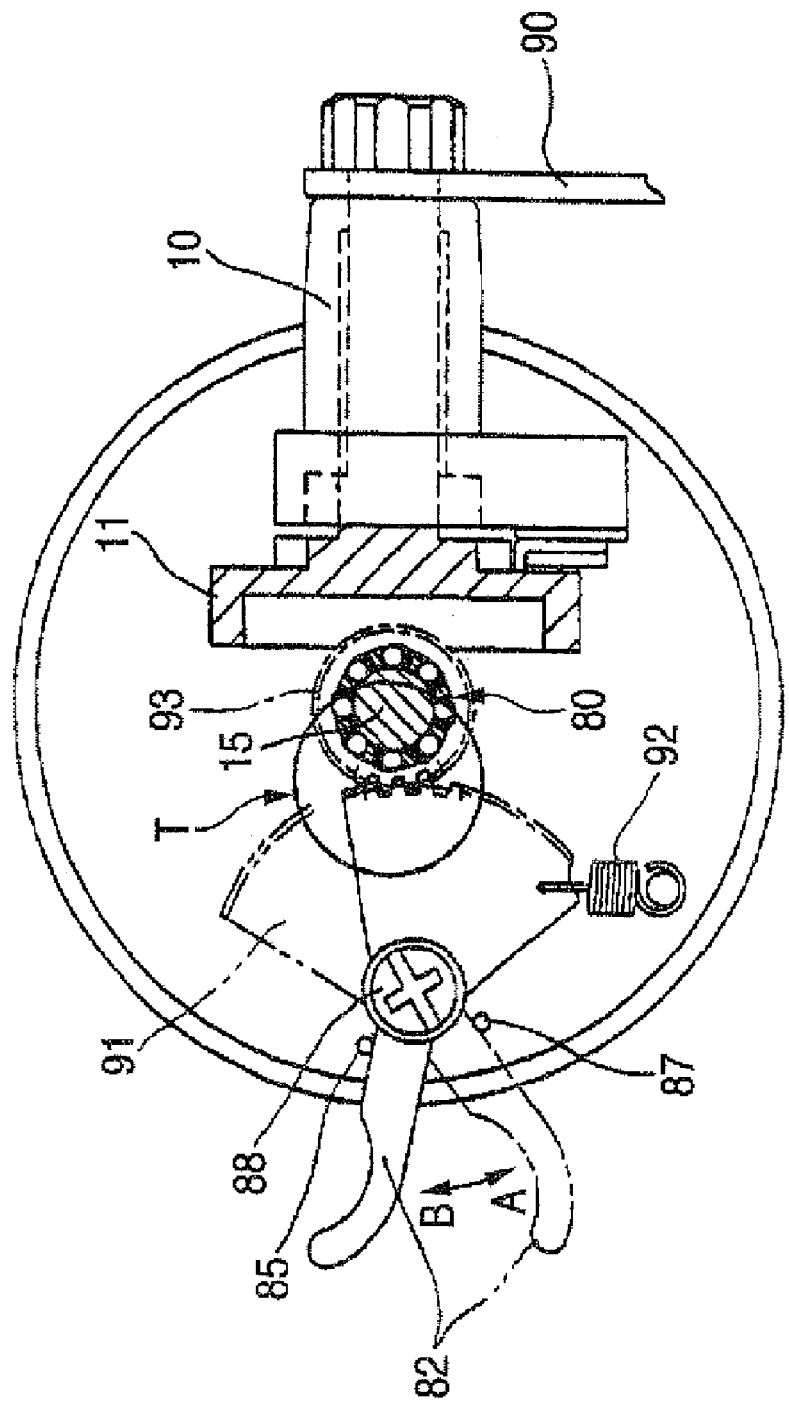
FIG. 10 is a rear view illustrating a substantial part of the closed face reel of FIG. 9.
Figure 11:
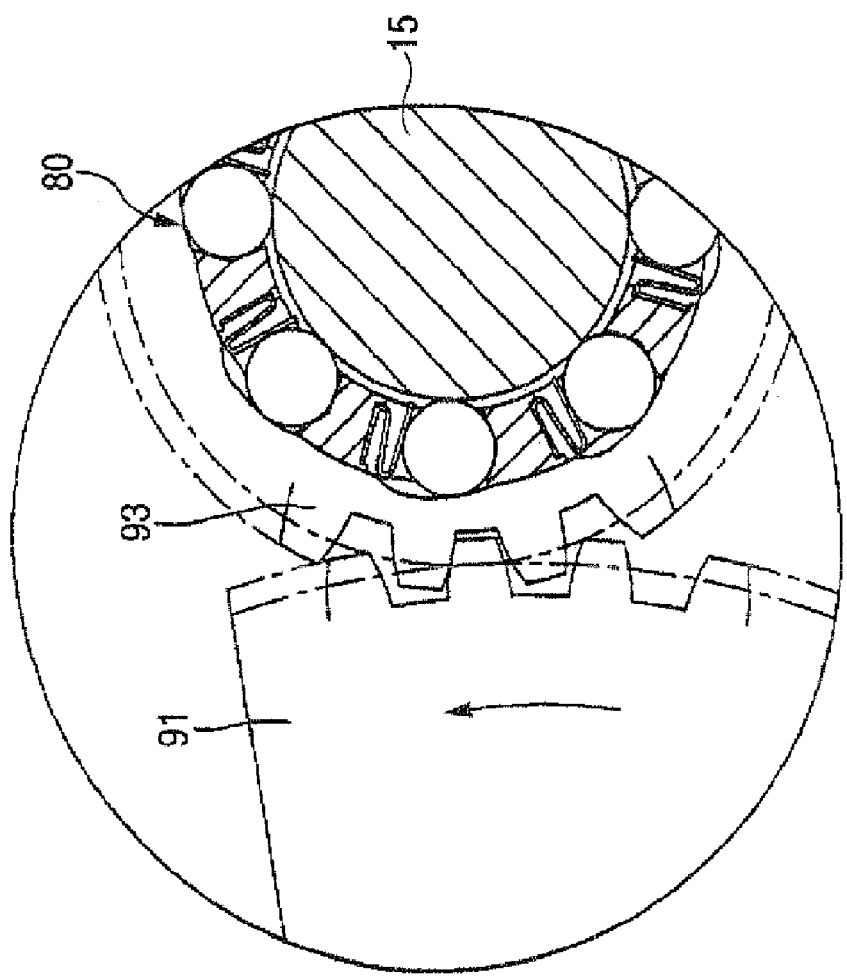
FIG. 11 is an enlarged cross sectional view illustrating a T part of FIG. 10.

FIG. 9 through FIG. 11 show a second embodiment of the present invention. In the foregoing first embodiment, the handle shaft 10 is rotated by operating the return operation member 60. Furthermore, the pin 35b is returned to the fishing line windable state by causing the main shaft 15 and the rotor 30 to rotate via the handle shaft 10. In the second embodiment, however, the main shaft 15 and the rotor 30 are directly rotated by operating a return operation member, so that the pin 35b is returned to the fishing line windable state. Specifically, in the present embodiment, a return operation member 82 for causing the fishing line latching member 35 in the fishing line releasable state to return to the fishing line windable state is provided on a side of the reel main body 2, as shown in FIG. 9 and FIG. 10. Thus, a fishing line release operation member 51, disposed on the rear end of; the reel main body 2 as in the first embodiment, is provided so as to enlarge in the lateral direction and have a size covering the return operation member 60 constituted as in the first embodiment.

The return operation member 82 is supported to be rotationally movable (in a direction indicated by an arrow AB of FIG. 10) about a spindle 88 relative to the reel main body 2. Furthermore, the return operation member 82, allowed to have up and down movement, is provided at a position allowing the user to easily operate it with a finger of his/her hand holding the fishing rod (or, at a position allowing the user to operate it with another finger of the hand while unmoving the finger placed on the fishing line release operation member 51). Specifically, the return operation member 82 is constituted as a rotation lever. In order to define the range of the up and down movement of the return operation member 82, stoppers 85 and 87 are provided above and below the reel main body 2.

Furthermore, as clearly shown in FIG. 10 and FIG. 11, on an end portion of the return operation member 82 located inside the reel main body 2, a substantially fan-shaped first toothed wheel 91 is integrally formed which engages a second toothed wheel 93 provided in the main shaft 15. The second toothed wheel 93 is attached to the main shaft 15 via a one way clutch 80. This allows only a force exerted in a direction in which the return operation member 80 is pushed down (direction indicated by an arrow A of FIG. 10) to be transmitted to the main shaft 15, while preventing a rotation force exerted in a direction in which the return operation member 82 is pulled up (direction indicated by an arrow B of FIG. 10). An urging spring 92 is inserted between the reel main body 2 and the first toothed wheel 91, and constantly urges the return operation member 82 in the pulling up direction.

In the above configuration also, as in the first embodiment, it is possible to cause the fishing line latching member 35 in the fishing line releasable state to return to the fishing line windable state by pushing down the return operation member 82 being independent from the handle 90. That is, pushing down the return operation member 82 causes the first toothed wheel 91 to rotate in the counterclockwise direction (direction indicated by an arrow of FIG. 11), and the main shaft 15 and the rotor 30 rotates in the fishing line winding direction due to the engagement of the toothed wheels 91 and 93 and wedge action of the one way clutch 80. Accordingly, with the cam action of the cam portion 25 of the main shaft 15 engaged with the bottom end of the main body portion 35a, the pin 35b of the fishing line latching member 35 protrudes from the circumference wall 30a of the rotor 30, resisting the biasing force of the urging spring 38, so that the fishing line S is picked up. In this state, when the finger is detached from the return operation member 82, the return operation member 82 automatically makes rotary motion and returns to the initial top position by the biasing force of the urging spring 92. That is, the second embodiment can also have the same effects as those of the first embodiment.

The present invention is applicable to various closed face reels.

What is claimed is:

1. A closed face reel comprising:
   a reel main body;
   a spool provided on the reel main body;
   a rotor rotatably attached to the reel main body;
   a handle provided on the reel main body for rotating the rotor;
   a fishing line guiding portion for guiding a fishing line to be wound on the spool, the fishing line guiding portion being selectively positioned in a fishing line windable state in which the fishing line guiding portion protrudes from an outer circumference of the rotor and a fishing line releasable state in which the fishing line guiding portion does not protrude from the outer circumference of the rotor;
   a releasing member provided on the reel main body, which moves the fishing line guiding portion from the fishing line windable state to the fishing line releasable state by repressing the releasing member;
   a returning member provided on the reel main body, which moves the fishing line guiding portion from the fishing line releasable state to the fishing line windable state by depressing the returning member; and
   a cover covering the spool and the rotor.

2. The closed face reel according to claim 1, wherein the returning member moves the fishing line guiding portion from the fishing line releasable state to the fishing line windable state via a one way clutch.

3. The closed face reel according to claim 1, wherein the returning member is provided in the reel main body so as to be adjacent to the releasing member.

* * * * *